United States Patent

Klinkosch

[15] 3,650,863

[45] Mar. 21, 1972

[54] METHOD OF MAKING LAMINATED FOAM-FILLED STRUCTURAL UNITS

[72] Inventor: Reinhard Klinkosch, Dortmund, Germany

[73] Assignee: Hoesch Aktiengesellschaft, Dortmund, Germany

[22] Filed: July 9, 1969

[21] Appl. No.: 840,397

[30] Foreign Application Priority Data

July 17, 1968 Germany ................. P 17 79 192.3

[52] U.S. Cl. ........................... 156/79, 156/78, 156/90, 156/201
[51] Int. Cl. .............................................. B32b 5/18
[58] Field of Search ............ 156/78, 79, 71, 216, 137, 90, 156/201; 161/115

[56] References Cited

UNITED STATES PATENTS 2,875,117  2/1959  Rotchen et al. .................. 156/78 X
2,957,207  10/1960  Roop et al. .................... 156/79 X
3,213,071  10/1965  Campbell ....................... 156/79 X
3,283,346  11/1966  Marsh et al. ................... 156/216

Primary Examiner—Benjamin R. Padgett
Assistant Examiner—S. R. Hellman
Attorney—Michael S. Striker

[57] ABSTRACT

Structural units, and method and apparatus for making the same. Two webs are advanced in spaced parallel predetermined paths. A foam material is deposited on the upper surface of the lower web and foamed to form a foam layer. An intermediate web is applied onto the foam layer. An intermediate layer of sound- or fire-retarding material is applied onto the intermediate web, and the space between the intermediate layer and the upper web has foam material introduced thereinto and converted into a foam layer, whereby to obtain an elongated structural laminar unit consisting of the various layers and webs which adhere to one another.

10 Claims, 4 Drawing Figures

PATENTED MAR 21 1972 3,650,863
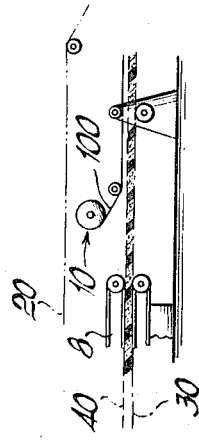
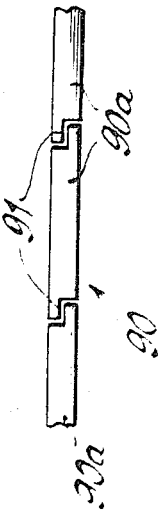
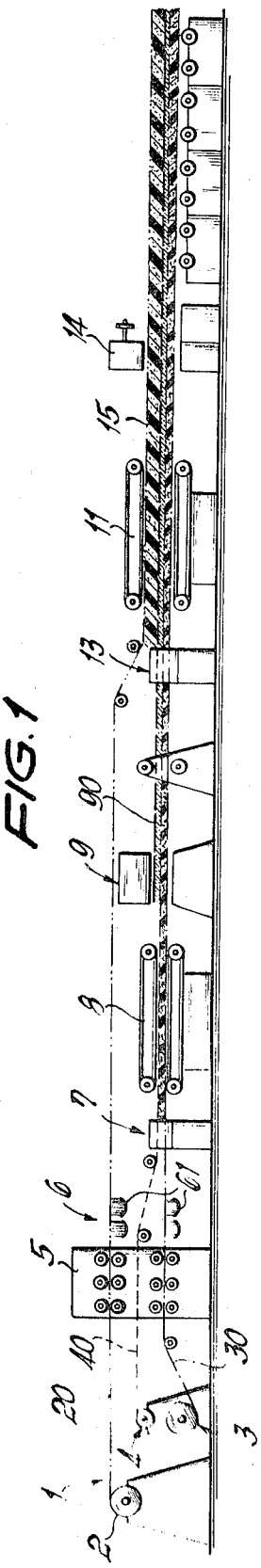
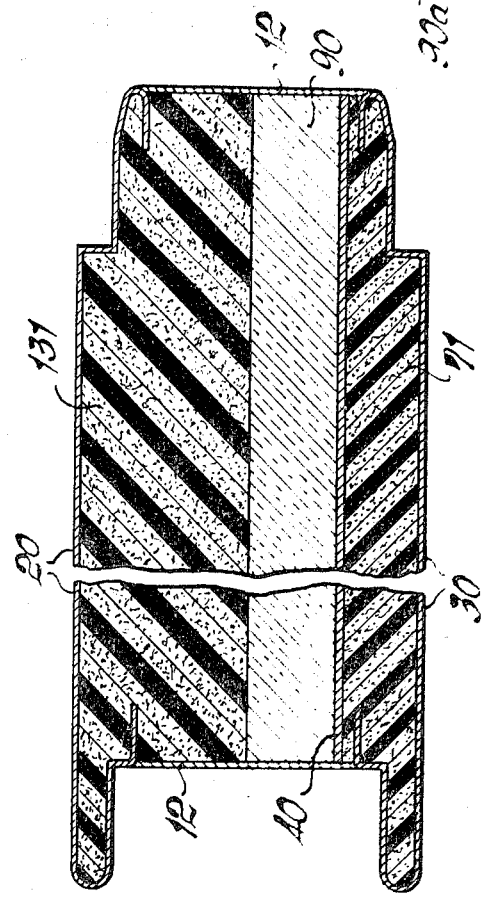
FIG.1
FIG.2
FIG.3
FIG.4
INVENTOR
Reinhard Kleskovic.
by Michael S. Stricker
attorney

METHOD OF MAKING LAMINATED FOAM-FILLED STRUCTURAL UNITS

BACKGROUND OF THE INVENTION

The present invention relates generally to structural units such as are used in the erection of wall structures and the like, and more specifically to laminar structural units.

Still more particularly the invention relates to such laminar structural units, to a method of making the same and to an apparatus for carrying the method to effect.

Laminar structural units are already known. In their simplest form they usually consist of a layer of foamed plastic material sandwiched between two outer cover layers of sheet steel or the like. Such units utilize the sound and thermal insulating properties of the foamed plastic material, and capitalize upon the light weight of such material, the outer cover layers providing mechanical protection for the foamed plastic material which is not very resistant to damage.

Conventionally, such structural units are made by cutting the layers of sheet steel to requisite side, bending their longitudinal edge portions to one side of the general plane of the respective sheet, superimposing two such sheets with spacing, interposing a rigid profiled member along the edges of the thus-superimposed sheets for maintaining the same in predetermined spaced relationship, and thereupon heating the sheets. Once heated, the sheets are then introduced into a form which limits movement of the sheets outwardly away from one another, and a foamable synthetic plastic substance is introduced into the space between the sheets and foamed by contact with the same as a result of the elevated temperature to which the sheets have been brought. When the reaction time for the foamable synthetic plastic material has passed, the now-completed laminar panel is removed from the foam which, conventionally, has been advanced stepwise during the manufacturing process.

Of course, this and other similar methods already known possess various disadvantages. Thus, the number of individual processing steps required is rather great. It is necessary to cut the sheet steel panels to size, to shape their edge portions, to position the panels properly relative to one another, to introduce the profiled spacers, to introduce the assembly into a form, to introduce the foamed plastic material into the space between the steel sheets, and subsequently to remove the completed laminar panel from the form. This is evidently expensive and time consuming, requiring considerable manpower.

One attempt in this field which aims to overcome some of these problems provides for continuously advancing two webs of sheet steel or other material in superimposed spaced parallel paths, to introduce into the gap between these webs a foamable synthetic plastic material and foaming it to thereby obtain a continuous strip composed of the foam layer to which the webs adhere at opposite sides, and which strip can subsequently be subdivided into structural panels or units of desired size. This is a much simpler and therefore less expensive way of producing such panels. However, it is still not entirely satisfactory because, particularly if the units are to be used in the erection of multi-story structures or for analogous purposes, the requirements made of the units with reference to their fire-retarding and/or sound-retarding properties are such that they cannot be met by units constructed in accordance with the last-mentioned procedure.

SUMMARY OF THE INVENTION

It is, accordingly, a general object of the present invention to overcome this disadvantage.

More particularly it is an object of the present invention to provide a novel laminar structural unit which is capable of meeting more stringent requirements than the existing structural units of this type known from the prior art.

A concomitant object of the invention is to provide a method of making such structural units.

Still an additional object of the invention is to provide an apparatus for carrying the method into effect.

In pursuance of the above objects, and others which will become apparent hereafter, one feature of my invention resides in a method of continuously making laminar structural units, particularly for use in wall constructions and the like. My novel method comprises the steps of continuously advancing an elongated strip-shaped first web in a predetermined path with a major surface facing upwardly, and continuously applying at a first location onto this major surface of the advancing first web a first foamable synthetic plastic material which thereupon is foamed so as to be converted into a first layer of foamed plastic covering the major surface and adhering thereto.

Onto this first layer a strip-shaped second web is continuously applied at a second location downstream of the first location, and thereupon an intermediate layer of a material different from that of the first layer is deposited on the second web at a third location downstream of the second location.

A strip-shaped elongated third web is continuously advanced in the aforementioned predetermined path upwardly spaced from and in substantial parallelism with the upper side of the intermediate layer so as to form therewith a gap at a fourth location downstream of the third location, and into this gap there is introduced at a fifth location a second foamable synthetic plastic material which is thereupon foamed so as to convert it into a second layer of foamed plastic which fills the gap and adheres both to the intermediate layer and to the third web.

The intermediate layer may either consist of individual sections which may be deposited on the second web manually, or it may be in form of a continuous strip which is continuously machine-applied onto the second web.

The present invention permits the continuous production of laminar panels or structural units provided with sound-retarding, fire-retarding or analogous intermediate layers, and which are thus capable of meeting the aforementioned more stringent requirements.

It is evident, of course, that by varying the material of the intermediate layer the thus-produced structural units can be adapted for different requirements, that is they can be adapted for instance for sound-retarding uses simply by utilizing for the intermediate layer a material having sound-retarding properties, with other materials being used where different requirements exist. Similarly, more than one intermediate layer and/or more than one second web may be provided if desired, just as it will be evident that the material of the first, second and third web can be varied at will and again in accordance with given requirements.

The use of conventional spacing elements in the manufacture of such laminar structural units is avoided and the manufacture of the novel unit is greatly simplified not only by this, but also by the generally simpler and more economical operation. It will be evident that the method and apparatus disclosed herein permit a continuous automated mass production wherein the expenses involved in the material and the manufacture of the separate spacing elements for the webs are eliminated, wherein time consuming and expensive handling and transportation of individual precut web panels is avoided, wherein the danger of damage to special coatings for the webs is avoided or largely eliminated, and wherein there exists no need to readjust the entire apparatus whenever a change in the length of the finished individual structural units is necessary, because the present invention provides for production of a continuous elongated laminar strip or assembly which can then be severed into structural units of desired length.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic side-elevational view of an apparatus according to the present invention;

FIG. 2 is a diagrammatic side-elevational detail view of one modified processing unit for use of the apparatus shown in FIG. 1;

FIG. 3 is a transverse cross section through a structural unit according to the present invention; and FIG. 4 is a fragmentary diagrammatic side-elevational view, on an enlarged scale, of one possible embodiment of the intermediate layer.

DESCRIPTION OF THE PREFERRED EMBODIMENTS

Discussing firstly FIG. 1 and the apparatus shown therein, it will be seen that supply means for a plurality of elongated webs is identified with reference numeral 1. This supply means comprises a payoff 2 for an upper web 20 and a payoff 3 for a lower web 30. A further payoff 4 is provided for an intermediate web 40. Each of the payoffs 2, 3 and 4 supports a coil of the respective web 20, 30 or 40 so that the webs can be withdrawn simply by exerting tension on them in a direction from the left towards the right-hand side of FIG. 1.

The webs may consist of various different materials, for instance metal, plastic, paper, fabrics, suitable laminates or the like. It is generally preferred, but by no means to be considered exclusive, to make the webs 20 and 30 of metallic material. Downstream of the payoffs 2, 3 and 4 there is arranged a forming station 5 of well known construction wherein the lateral edges of the webs 20 and 30 are profiled, which is to say that they are inwardly deformed in the manner evident from FIG. 3. The reason for this is to assure that these lateral edges later become embedded in the synthetic plastic material of the foam layers 71 and 131 as shown in FIG. 3; this protects these lateral edges against corrosion.

Downstream of the forming device 5 is a heating device 6 which in the illustrated embodiment uses a plurality of heaters 61 which radiate heat energy onto the webs 20 and 30 from above and below, respectively, and which heaters 61 are advantageously mounted for tilting movement about substantially horizontal axes so that they can be turned from positions in which their heat energy impinges upon the webs 20 and 30, to positions in which their heat energy is directed away from these webs. This is for purposes of heat regulation so that the heat energy emitted by the heaters 61 need not change for regulating purposes, variations in the heating of the webs 20 and 30 being simply effected by turning the heaters 61 in such a manner as to prevent the heat energy emitted by them to a greater or less degree from impinging upon the webs 20 and 30. The means by which the heaters 61 may be mounted in this manner, and the means for effecting their movement, are well known to those skilled in the art and are not thought to require detailed discussion, particularly because they do not themselves constitute the invention.

Immediately downstream of the heaters 61, which thus serve to heat the webs 20 and 30, there is arranged a foam station 7 at which foamable synthetic plastic material —such as foamable polyurethane or another foamable synthetic plastic material suitable for the purpose—is applied onto the upper side or upwardly directed major surface of the lower web 30. This foamable synthetic plastic material, and the temperature to which the lower web 30 has been heated by the heaters 61, are so selected that the reaction heat present in the web 30 at the time of its passage through the station 7 is sufficient to effect foaming of the foamable synthetic plastic material so that the same will form a layer of foamed plastic on the upper side of the web 30. As soon as this layer exists, that is as soon as the foamable synthetic plastic has undergone foaming and thereby been converted into this layer, the intermediate web 40 is guided onto the upper side of the thus-produced foamed layer. Guide rollers for this purpose are shown in FIG. 1 and are not believed to require detailed discussion. The web 40 may consist of different materials, for instance of paper.

The thus-produced semi-finished laminar structure now passes through a conventional advancing or conveying station 8 which is here illustrated as consisting of dual-belt conveyors, which grip the structure from above and below, serving to press the web 40 tightly against the upper side of the foamed layer, and advancing the semi-finished structure towards the right-hand side in FIG. 1.

Downstream of the station 8 there is arranged an applicator station 9 at which an intermediate layer 90 (compare FIG. 3) is applied onto the web 40. In FIG. 1 this application is effected manually, in that the layer 90 consists of a plurality of sections 90a which, in accordance with the present invention, have profiled or stepped interengaging transversely extending edges 91, as is diagrammatically illustrated in FIG. 4. This provides for more even and rapid positioning of the individual sections 90 without a gap between the sections.

IT is emphasized, however, that the layer 90 can also be supplied in a manner other than manually. This is shown by way of example and in diagrammatic form in FIG. 2 wherein this intermediate layer is designated with reference numeral 100 and is withdrawn from a further payoff 10 at which it is supplied in form of an endless coil, to be guided onto the upper side of the intermediate web 40 at the station 9. The layer 90 (or 100) consists of plates, respectively strips, for example made of asbestos, gypsum, glass-wool (organic and inorganic materials).

In any case, however, downstream of the station 9 there is arranged a further foaming station 13, and in the region of this foaming station the upper web 20 is guided into parallelism with the upper side of the intermediate layer 90 (or 100 if the modification of FIG. 2 is used) so as to form therewith a gap into which foamable synthetic plastic material—which may be the same as that introduced at the station 7—is introduced at the station 13. The web 20 is still hot from passing the heaters 61 and, as the assembly passes between the belts of another dual-belt advancing means 11, the foamable plastic material introduced at the station 13 undergoes foaming and is converted into a further layer of foamed plastic material which fills the gap between the upper side of the intermediate layer 90 (or 100) and the underside of the web 20.

The layers 71 and 131 consist of plastic foam, for example hard-foam of polyurethane (PU) or polyisocyanurate (PIC). These foams are made by mixing some liquid components (for example polyol, freon and/or water as expansion means, stabilizers and catalysts, isocyanate etc). Because of this exothermic reaction with the corresponding reaction temperature the, for example, PU-hard-foam arises. The using temperature of the said components is about 20° C. Because of the said exothermic reaction the temperature of the mixture may arise up to about 100° C., corresponding to the composition of the mixture.

In accordance with the present invention it is advantageous by applying—from positions laterally of the opposite sides of the apparatus shown in FIG. 1—respective foils 12 of paper or another similar material, against the free edges of the webs 20 and 30 to thereby close the gap existing between the upper side of the layer 90 (or 100) and the under side of the web 20, so as to prevent the foamable synthetic plastic material introduced at the station 13 from running out of this gap before it has a chance to undergo foaming, and also to provide a neat and clean edge for the finished structural unit. This is clearly shown in FIG. 3. These foils 12 will be applied in the region of the station 13 and the simple guide means necessary for this purpose are well known to those skilled in the art and are not thought to require detailed discussion. It is emphasized that the foils 12 are not spacing means for maintaining the webs 20 and 30 spaced from one another, because they lack the mechanical strength. They are therefore not equivalent to the spacing means known from the prior art for maintaining such spacing and are provided only for the above-described dual purposes.

From the advancing means 11 the completed assembly issues in form of an elongated laminar strip-shaped assembly 15 which is severed by the conventional cutting device 14 into structural units of desired length. Evidently, such covering devices as the one identified with reference numeral 14 which is entirely conventional and well known to those skilled in the art, are usually made adjustable so that the length of the individual structural units to be severed from the assembly 15 can be varied at will.

If desired, the intermediate layer 90, 100 may be apertured, that is it may be provided with holes, slits, slots or the like, so that by the foam of the second layer 131 the material of the layers 71 and 90 (or 100) may directly adhere to one another through the existing apertures and the web 40. However, the layer 90, 100 may also be continuous and non-apertured, and suitable means—such as any one of many well-known adhesives suitable for the purpose—may be provided to adhere the layer 90, 100 through the web 40 to the layer 71. In any case there is a safe connection between the webs and layers.

It will be understood that each of the elements described above, or two or more together, may also find a useful application in other types of applications differing from the types described above.

While the invention has been illustrated and described as embodied in laminar structural units, it is not intended to be limited to the details shown, since various modifications and structural changes may be made without departing in any way from the spirit of the present invention.

I claim:

1. A method of continuously making laminar structural units, particularly for use in wall constructions and the like, comprising the steps of continuously advancing an elongated strip-shaped first web in a first predetermined path with a major surface facing upwardly; continuously applying at a first location onto said major surface of the advancing first web a first foamable synthetic plastic material, and thereupon foaming the same for converting it into a first layer of foamed plastic covering said major surface and adhering thereto; continuously applying onto said first layer a strip-shaped second web at a second location downstream of said first location; depositing on said second web an intermediate layer of a material different from that of said first layer at a third location downstream of said second location; continuously advancing an elongated strip-shaped third web in a second predetermined path upwardly spaced from and in substantial parallelism with the upper side of said intermediate layer to form therewith a gap at a fourth location downstream of said third location; and continuously introducing into said gap at a fifth location a second foamable synthetic plastic material, and thereupon foaming the latter so as to convert it into a second layer of foamed plastic filling said gap and adhering to said intermediate layer and to said third web.

2. A method as defined in claim 1, wherein said first and said second materials are preferably identical.

3. A method as defined in claim 1, wherein at least one of said first and third webs consists at least in part of metallic material.

4. A method as defined in claim 1, wherein said second web consists of paper.

5. A method as defined in claim 1, wherein said material of said intermediate layer is fire retardant.

6. A method as defined in claim 1, wherein said material of said intermediate layer is sound retardant.

7. A method as defined in claim 1, wherein the step of depositing said intermediate layer comprises depositing said intermediate layer manually on said second web.

8. A method as defined in claim 1, wherein said second layer is provided in form of a coil, and wherein the step of applying said second layer to said first layer comprises withdrawing said second layer from said coil.

9. A method as defined in claim 1; and further comprising the step of applying a strip material against the opposite longitudinal edges of said webs at least intermediate said fourth and fifth locations and prior to introducing of said second material, to thereby laterally close said gap and define an enclosed space for preventing lateral escape of said second material.

10. A method as defined in claim 1; and further comprising the step of continuously bending the opposite longitudinal edges of said first and third webs inwardly towards one another prior to applying and introducing of said first and second materials, respectively.

* * * * *